(12) United States Patent
Chang

(10) Patent No.: US 8,559,282 B2
(45) Date of Patent: Oct. 15, 2013

(54) AVERAGE SERVO CONTROL METHOD AND SYSTEM, AND TARGET LEVEL DETERMINATION METHOD APPLIED IN THEREOF

(75) Inventor: Po-Wei Chang, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 781 days.

(21) Appl. No.: 12/052,008

(22) Filed: Mar. 20, 2008

(65) Prior Publication Data

US 2009/0238049 A1    Sep. 24, 2009

(51) Int. Cl.
G11B 7/00 (2006.01)
(52) U.S. Cl.
USPC .................. 369/44.25; 369/44.29; 369/44.35; 369/44.36
(58) Field of Classification Search
USPC ....................... 369/44.29, 44.35, 44.25, 44.36
See application file for complete search history.

(56) References Cited

U.S. PATENT DOCUMENTS

| | | | |
|---|---|---|---|
| 4,661,942 A | 4/1987 | Yoshimoto et al. | |
| 4,951,273 A * | 8/1990 | Yoshida et al. | 369/44.31 |
| 5,142,518 A | 8/1992 | Hangai et al. | |
| 5,150,345 A | 9/1992 | Shikichi et al. | |
| 5,317,143 A * | 5/1994 | Yoshimoto et al. | 250/201.5 |
| 5,710,748 A * | 1/1998 | Hofer | 369/44.35 |
| 5,757,747 A * | 5/1998 | Shimada | 369/44.28 |
| 5,757,748 A * | 5/1998 | Kiyoura et al. | 369/44.29 |
| 5,790,482 A | 8/1998 | Saga et al. | |
| 5,856,960 A * | 1/1999 | Hwangbo et al. | 369/44.28 |
| 6,556,525 B1 * | 4/2003 | Takiguchi | 369/53.24 |
| 6,751,171 B2 | 6/2004 | Ohta | |
| 7,542,381 B2 | 6/2009 | Buechler | |
| 7,688,691 B2 | 3/2010 | Hayakawa | |
| 2005/0128901 A1 * | 6/2005 | Takeda et al. | 369/44.29 |
| 2006/0133234 A1 * | 6/2006 | Inada | 369/44.29 |
| 2007/0058502 A1 | 3/2007 | Huang et al. | |
| 2009/0141598 A1 * | 6/2009 | Hsin et al. | 369/44.23 |

FOREIGN PATENT DOCUMENTS

| | | |
|---|---|---|
| CN | 1725346 | 1/2006 |
| CN | 1932995 | 3/2007 |
| CN | 1977319 | 6/2007 |
| TW | 541522 | 7/2003 |
| TW | 200739564 | 10/2007 |

OTHER PUBLICATIONS

English language translation of abstract of CN 1725346 (published Jan. 25, 2006).

(Continued)

Primary Examiner — Joseph Feild
Assistant Examiner — Linh N Hoffner
(74) Attorney, Agent, or Firm — McClure, Qualey & Rodack, LLP

(57) ABSTRACT

An average servo control method is provided. A target level of at least a servo signal is first detected, which is corresponding to a present condition of the optical disc drive. The target level is then compared with a current level of the servo signal, and a average servo loop gain is adjusted based on the comparison result. A target level calibration may be performed before the gain adjustment. The target level calibration analyzes the servo signal to determine a plurality of preset target levels each corresponding to a different condition. The preset target levels and corresponding conditions are stored as a lookup table. In this way, the target level is acquired based on the lookup table and the present condition.

17 Claims, 4 Drawing Sheets

(56) References Cited

OTHER PUBLICATIONS

English language translation of abstract of CN 1977319 (published Jun. 6, 2007).

English language translation of abstract of TW 541522 (published Jul. 11, 2003).

English language translation of abstract of TW 200739564 (published Oct. 16, 2007).

* cited by examiner

AVERAGE SERVO CONTROL METHOD AND SYSTEM, AND TARGET LEVEL DETERMINATION METHOD APPLIED IN THEREOF

BACKGROUND OF THE INVENTION

1. Field of the Invention

The invention relates to optical disc drives, and in particular, to an average servo control method and system, and a target level determination method for an optical disc drive.

2. Description of the Related Art

FIG. 1 shows a conventional average servo loop of an optical disc drive. The optical disc drive usually comprises a mechanical module 110, a gain down stage 120, and a post processing stage 130. The mechanical module 110 conclusively comprises a pickup head, a plurality of photo detectors and other mechanical parts such as an actuator (not shown). A laser beam is radiated from the mechanical module 110 to an optical disc (not shown), and reflected light is detected by the photo detectors. The actuator in the mechanical module 110 adjusts focus and track conditions of the laser beam based on the driving signal #drive feedback from the post processing stage 130. The photo detectors in the mechanical module 110 send their photo detection results #light to the gain down stage 120, and the gain down stage 120 converts them into servo signals #servo such as playback signals (RF signals), focus error (FE) signals and push-pull (PP) signals based on a certain gain control mechanism. The RF signals represent information recorded on the optical disc, and the PP signals comprise tracking error (TE) signals and wobble signals. After the gain down stage 120 justifies the gains of the photo detection results #light, the post processing stage 130 receives the servo signals #servo to determine the servo condition and then sends the driving signal #drive to the mechanical module 110.

Conventionally, one of the servo signals #servo such as playback signals (RF signals), focus error (FE) signals and push-pull (PP) signals is selected as an index signal #index. A comparator 122 is coupled to the output of gain down stage 120, providing gain adjustment to the photo detection results #light based on the index signal #index. For example, the total power of the RF signals (also referred to as RF sum), is sent to the comparator 122 as the index signal #index. The comparator 122 compares the index signal #index and a target level #target, whereby their difference is used to adjust the gains of the servo signals. Specifically, a control signal #ctrl is generated from the comparator 122 and fed back to the gain down stage 120 to adjust the gains used in the gain down stage 120. In this way, the RF, FE and PP signals generated from the gain down stage 120 can have constant gain levels approximately identical to the target level #target.

Since servo signals #servo are utilized for servo loop compensation that keeps the focusing and the tracking stable, gain control thereof is critical. The comparator 122 conventionally utilizes a constant target level #target to achieve consistent gains of the servo signals #servo, however, a constant target level #target is considered inadequate for some conditions, particularly when the photo detection results #light varies with track position due to disc dye material dis-uniformity, reflection variation, and spinning speed variation. Thus, failure may occur when performing a write procedure to a disc when using a constant predetermined target level #target. An improved gain adjustment mechanism is thus desirable.

BRIEF SUMMARY OF INVENTION

An aspect of an average servo control method is provided. A target level of at least a servo signal is first detected, which is corresponding to a present condition of the optical disc drive. The target level is then compared with a current level of the servo signal, and the gain is adjusted based on the comparison result.

A target level calibration may be performed before the gain adjustment. The target level calibration analyzes the servo signal to determine a plurality of preset target levels each corresponding to a different condition. The preset target levels and corresponding conditions are stored as a lookup table. In this way, the target level is acquired based on the lookup table and the present condition.

To acquire the target level, at least two adjacent preset target levels are interpolated to render a target curve, and the target level is located on the target curve based on the present condition.

The present condition of the optical disc drive is dependent on at least one of the following conditions: a position of an optical disc being accessed by the optical disc drive, a reading/recording speed of the optical disc drive, an operation mode of the disc drive, and a rotational speed of the optical disc. The servo signal is selected from one of the following signals: a radio frequency (RF) signal, a focusing error signal, a tracking error signal, and an average RF signal.

The servo signal is detected by a plurality of photo detector, wherein each photo detector has a corresponding gain partially contributed to the servo signal, and the gain is selected from a group comprising: a gain for amplifying the servo signal and a gain for amplifying a detecting portion of the servo signal.

In an alternative embodiment, a target level determination method for determining the target level is also claimed. A present condition of the optical disc drive is first detected. The target level is determined according to the present condition.

A further embodiment is an average servo controlling system implementing the servo control method. Said average servo controlling system comprises a level determining module for determining the target level, a comparing module for comparing the target level and a current level of the servo signal, and a gain adjusting module for adjusting the gain based on the difference between the target level and the current level. A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
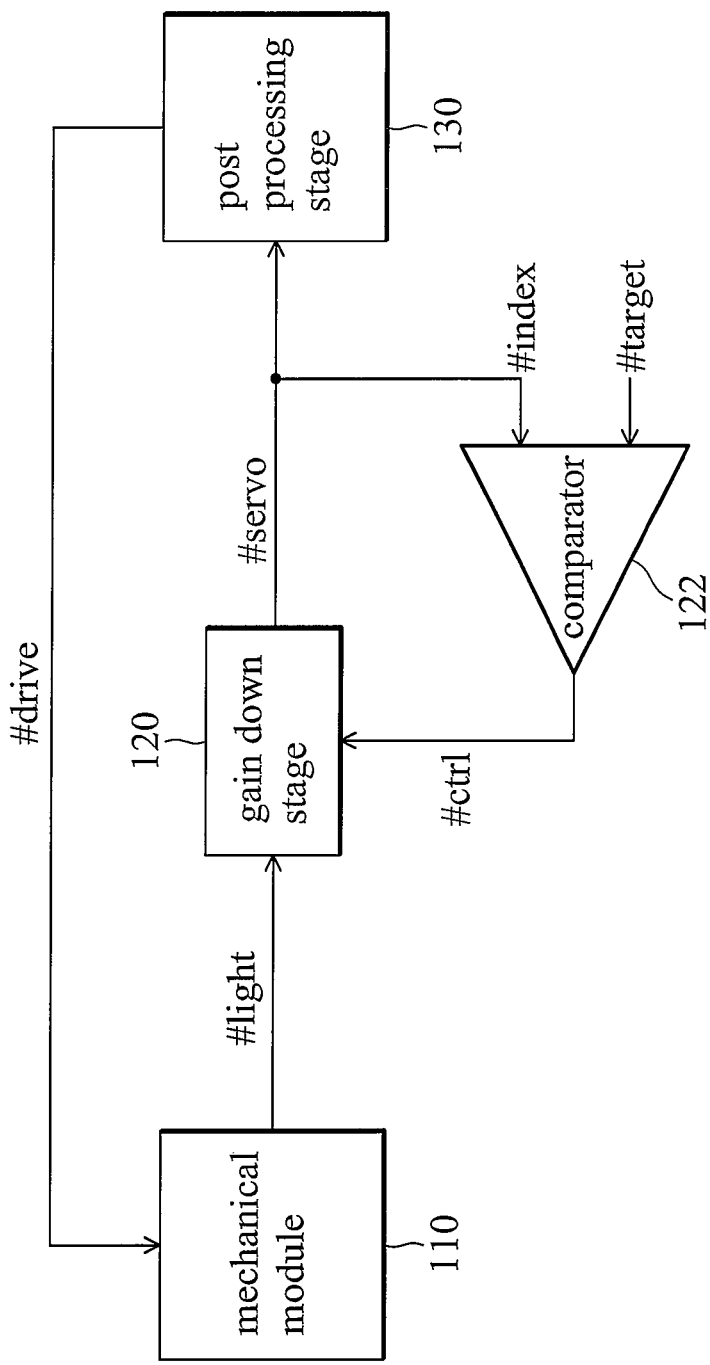
FIG. 1 shows a conventional average servo loop of an optical disc drive.
Figure 2:
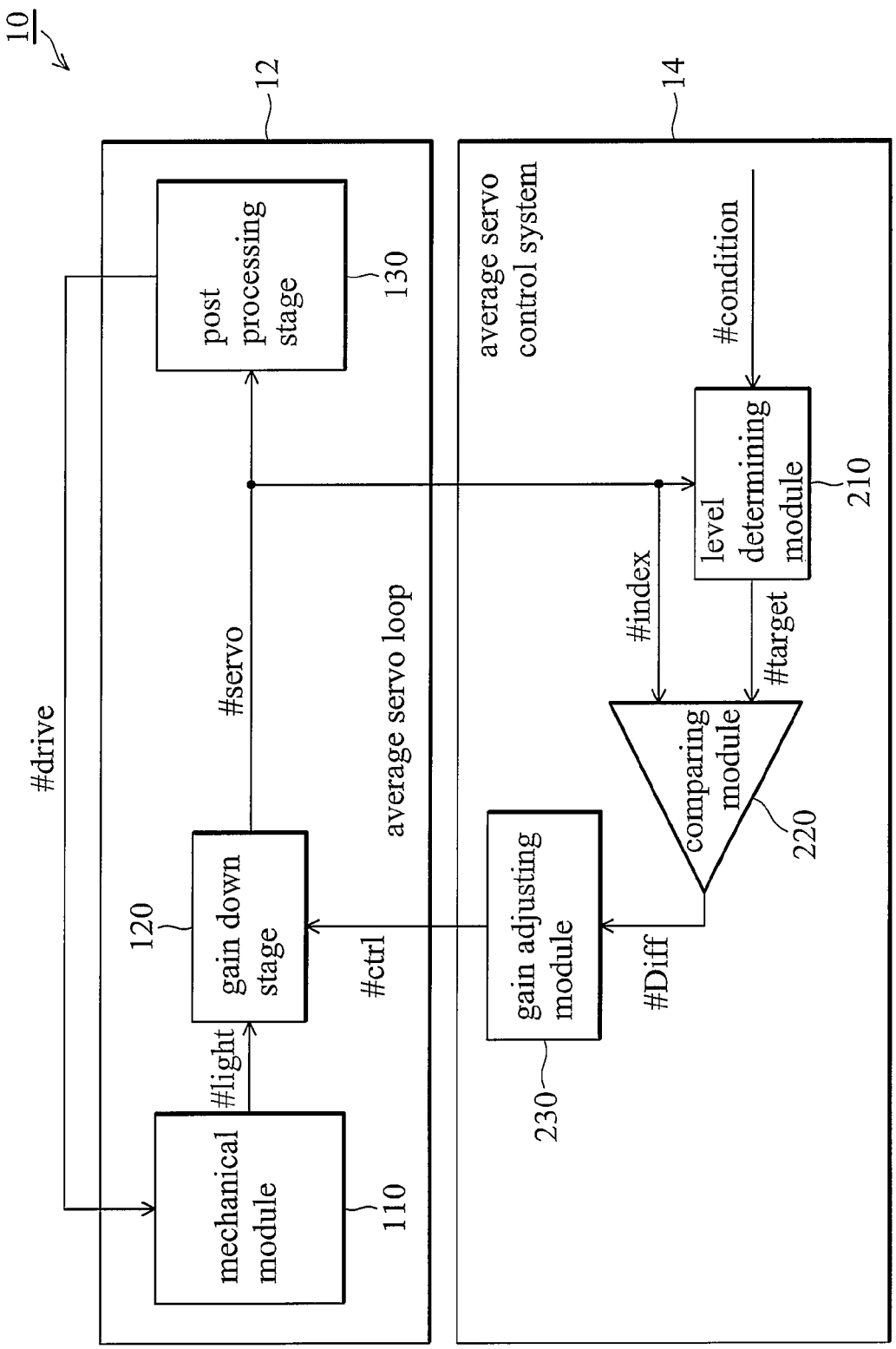
FIG. 2 shows an embodiment of an average servo control system of an optical disc drive.
Figure 3:
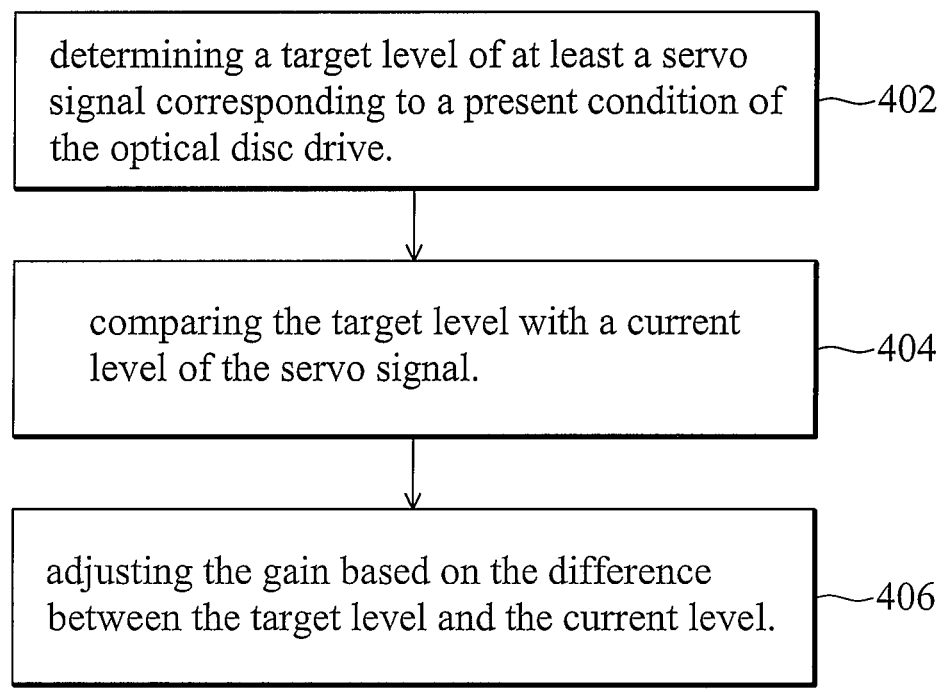
FIG. 3 is a flowchart of an average servo control method according performed by the average servo control system.

FIG. 2 shows an embodiment of an average servo control system 14 of an optical disc drive 10. FIG. 3 is a flowchart of an average servo control method according performed by the average servo control system 14. The optical disc drive 10 comprises a mechanical module 110, a gain down stage 120, and a post processing stage 130 that forming an average servo loop 12. In the mechanical module 110, one or more photo detectors detect reflection light. The photo detection results #light are sent to the gain down stage 120, and the gain down stage 120 amplifies the photo detection results #light by a gain value to generate servo signals #servo. The post processing stage 130 receives the servo signals #servo to detect disturbances and generates a driving signal #drive is fed back to the mechanical module 110 to accordingly compensate the detected errors. In the embodiment, an average servo control system 14 of the optical disc drive 10 comprises a level determining module 210, a comparing module 220, and a gain adjusting module 230. The level determining module 210 is coupled to the gain down stage 120, providing a dynamic target value #target corresponding to the present condition #condition of the optical disc drive, such as shown in step 402. The condition #condition, for example, may be the track position of a pickup head in the optical disc drive. The comparing module 220 receives the servo signal and gets the target level, and then compares the target level and a current level of the servo signal to generate a difference signal #Diff as a comparing result, such as shown in step 404. The gain adjusting module 230 adjusts a servo gain based on the difference between the target level and the current level, such as shown in step 406.

As an example, the gain down stage 120 comprises a plurality of amplification units for amplifying the photo detection results #light based on a control signal #ctrl provided by the gain adjusting module 230. The servo signal is detected by a plurality of photo detectors, wherein each photo detector has a corresponding amplification units for amplifying the detected signal partially contributed to the servo signal by a gain value. The gain adjusting module 230 can generate the control signal #ctrl to adjust a gain for amplifying the servo signal or a gain for amplifying a detecting portion of the servo signal. The servo signals #servo are thereby generated from the gain down stage, comprising a radio frequency (RF) signal, a focusing error signal, a tracking error signal, and an average RF signal. One of the servo signals #servo is selected to be an index signal #index. Practically, the index signal #index is the RF sum signal that indicates a total of reflection power.

In the embodiment, the level determining module 210 pre-performing a target level calibration to establish a lookup table, in which various target levels corresponding to various conditions of the optical disc drive are recorded.

The present condition #condition of the optical disc drive is dependent on at least one of the following conditions: a position of an optical disc being accessed by the optical disc drive, a reading/recording speed of the optical disc drive, an operation mode of the disc drive, and a rotational speed of the optical disc. The operation mode comprises read mode and write mode. The target level calibration may be performed in read mode, such that at least two read indices corresponding to different track positions are obtained. A read index means an index signal #index in read mode, which varies with the track position. Specifically, the variation of read indices may be linear to the track positions, so a first or second order curve can be utilized to simulate their relationships. The level determining module 210 generates a target curve by interpolation of the read indices obtained from the calibration. For example, at least two indices are required to render a first order target curve, and three indices are required for a second order target curve. Relationships between the track positions and target levels can be equivalently represented as a target curve or a lookup table.

The calibration results obtained in read mode are used in write mode. When in write mode, a write target level is generated accordingly based on the track position and the target curve. Specifically, the target level controller 200 generates a target value #target, and the comparator 122 produces the control signal #ctrl by comparing the target value #target with the index signal #index. As described, various servo signals #servo such as tracking error (TE) signal, focus error (FE) signal, main push-pull offset (MPPO) signal, side push-pull offset signal (SPPO) and RF sum, are generated by amplifying the photo detection results #light based on the control signal #ctrl in the gain down stage 120. In this way, the RF, TE, FE and push-pull (PP) signals' gain level can adapt to the track position.

In write mode, the index signal #index read from the gain down stage 120 is referred to as a write index, having different magnitude level from a read index. Since laser radiation in write mode has at least five times the power of read mode, the detected servo signals #servo, as well as the write index, have significantly higher level in write mode. To provide adequate target level in write mode, the level determining module 210 performs a calculation based on the track position. For example, the track position is substituted into the target curve to obtain a read target value, and the read target value is converted to the write target value by a linear conversion formula:

$$y = ax + b \tag{1}$$

Where y is the write target value, x is the read target value, and a and b are offset constants. This transformation compensates the level difference between read and write modes, generating a write target value having a proper level for the disc writing procedure.

Thereafter, the comparing module 220 compares the write index signal with the write target value to generate difference signal #Diff. The gain adjusting module 230 receives the difference signal #Diff and generates the control signal #ctrl to adjust the gain for amplifying the servo signal or the gain for amplifying a detecting portion of the servo signal in the gain down stage 120.

Figure 4:
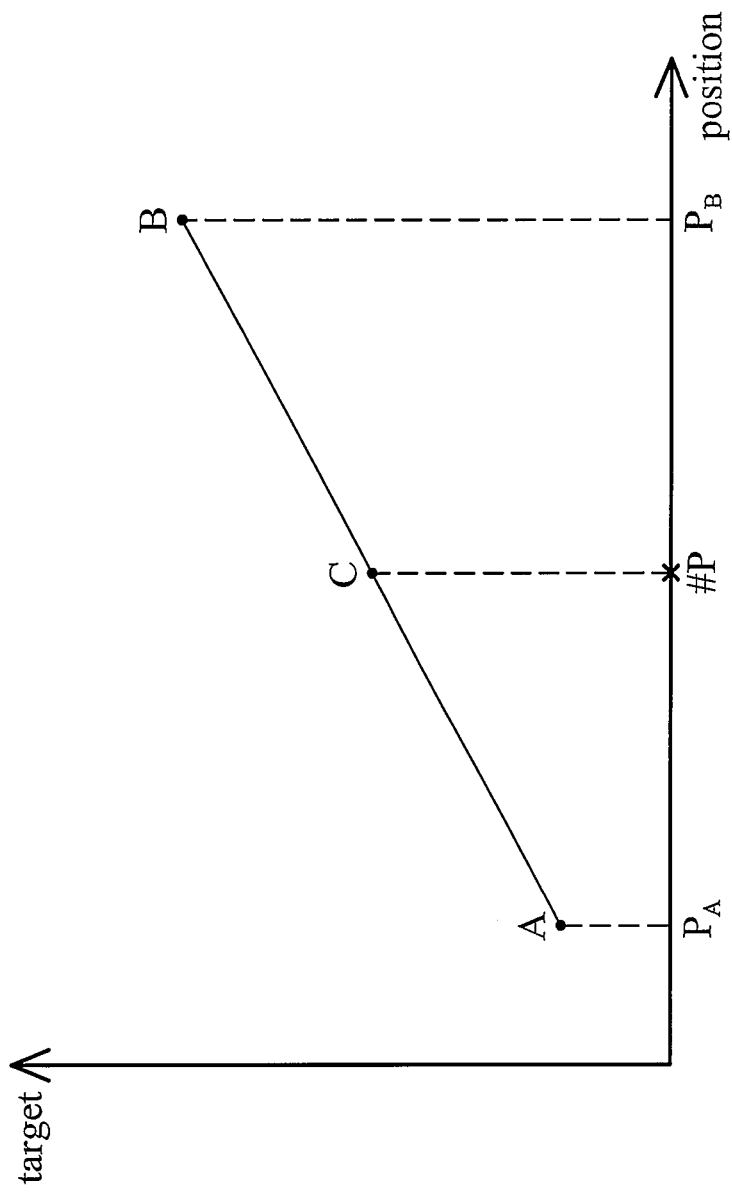
FIG. 4 shows a target curve based on position.

FIG. 4 shows a target curve based on position. In read mode, two read indices A and B are obtained at position PA and PB, thus a target curve can be generated by linear interpolation since the indices are linear to track position. In write mode, when the mechanical module 110 accesses a track position #P, a corresponding read target value C is obtained, and through formula (1), a write target value can be generated for the gain control of the servo control system. In an alternative embodiment, the interpolation may be a quadratic approximation interpolation. Additionally, a lookup table may be generated in read mode, collecting all read target values associated with each track position, and the write target value is directly obtained by looking up the table plus conversion of formula (1). The target curve may be defined in various ways with associated track position.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An average servo control method of an optical disc drive which has a plurality of photo detectors, comprising:
   receiving at least a servo signal via an average servo loop;
   determining a target level of the servo signal corresponding to a present condition of the optical disc drive;
   comparing the target level and a current level of the servo signal; and
   adjusting an average servo loop gain based on a difference between the target level and the current level;
   wherein the servo signal is detected by the plurality of photo detectors, and each photo detector has a corresponding gain partially contributed to the servo signal, and wherein an average servo gain being controlled is selected from a group comprising: a gain for amplifying the servo signal and a gain for amplifying a detecting portion of the servo signal.

2. The average servo control method as claimed in claim 1, further comprising:
   performing a target level calibration based on the servo signal to determine a plurality of preset target levels each corresponding to a different condition; and
   storing the preset target levels and corresponding conditions as a lookup table.

3. The average servo control method as claimed in claim 2, further comprising, acquiring the target level based on the lookup table and the present condition.

4. The average servo control method as claimed in claim 3, wherein the step of acquiring the target level comprises:
   interpolating at least two adjacent preset target levels to render a target curve; and
   locating the target level on the target curve based on the present condition.

5. The average servo control method as claimed in claim 1, wherein the present condition of the optical disc drive is dependent on at least one of the following conditions: a position of an optical disc being accessed by the optical disc drive, a reading/recording speed of the optical disc drive, an operation mode of the optical disc drive, and a rotational speed of the optical disc.

6. The average servo control method as claimed in claim 1, wherein the servo signal is selected from one of the following signals: a radio frequency (RF) signal, a focusing error signal, a tracking error signal, and an average RF signal.

7. A target level determination method for determining a target level of a servo signal generated by an average servo loop of an optical disc drive, the target level determination method comprising:
   determining a present condition of the optical disc drive;
   calculating the target level according to the present condition;
   performing a target level calibration based on the servo signal to determine a plurality of preset target levels each corresponding to a different condition; and
   storing the preset target levels and corresponding conditions as a lookup table.

8. The target level determination method as claimed in claim 7, further comprising, acquiring the target level based on the lookup table and the present condition.

9. The target level determination method as claimed in claim 8, wherein the step of acquiring the target level comprises:
   interpolating at least two adjacent preset target levels to render a target curve; and
   locating the target level on the target curve based on the present condition.

10. The target level determination method as claimed in claim 7, wherein the present condition of the optical disc drive is dependent on at least one of the following conditions: a position of an optical disc being accessed by the optical disc drive, a reading/recording speed of the optical disc drive, an operation mode of the optical disc drive, and a rotational speed of the optical disc.

11. The target level determination method as claimed in claim 7, wherein the servo signal is selected from one of the following signals: a radio frequency (RF) signal, a focusing error signal, a tracking error signal, and an average RF signal.

12. An average servo control system of an optical disc drive having an average servo loop for generating at least a servo signal, the optical disc drive has a plurality of photo detectors, each photo detector has a corresponding gain partially contributed to the servo signal, the average servo control system comprising:
   a level determining module for determining a target level of the servo signal corresponding to a present condition of the optical disc drive;
   a comparing module for comparing the target level and a current level of the servo signal; and
   a gain adjusting module for adjusting an average servo gain based on a difference between the target level and the current level;
   wherein the average servo gain is selected from a group comprising: a gain for amplifying the servo signal and a gain for amplifying a detecting portion of the servo signal.

13. The average servo control system as claimed in claim 12, wherein the level determining module further performs a target level calibration based on the servo signal to determine a plurality of preset target levels each corresponding to a different condition, and stores the preset target levels and corresponding conditions into a lookup table.

14. The average servo control system as claimed in claim 13, wherein the level determining module looks up the lookup table to acquire the target level corresponding to the present condition.

15. The average servo control system as claimed in claim 13, wherein the level determining module interpolates at least two adjacent preset target levels to render a target curve, and locates the target level on the target curve based on the present condition.

16. The average servo control system as claimed in claim 12, wherein the present condition of the optical disc drive is dependent on at least one of the following conditions: a position of an optical disc being accessed by the optical disc drive, a reading/recording speed of the optical disc drive, an operation mode of the optical disc drive, and a rotational speed of the optical disc.

17. The average servo control system as claimed in claim 12, wherein the servo signal is selected from one of the following signals: a radio frequency (RF) signal, a focusing error signal, a tracking error signal, and an average RF signal.

* * * * *